United States Patent
Tomaselli et al.

[19]

[11] Patent Number: 5,572,910
[45] Date of Patent: Nov. 12, 1996

[54] APPLICATION OF FACE GEARS TO HELICOPTER TRANSMISSIONS

[75] Inventors: Luigi Tomaselli, Turin; Valter Bologna, Grugliasco; Giovanni Oddone, Predosa, all of Italy

[73] Assignee: Studio Torta, Turin, Italy

[21] Appl. No.: 306,005

[22] Filed: Sep. 14, 1994

[30] Foreign Application Priority Data

Sep. 17, 1993 [IT] Italy .................. T093A0687

[51] Int. Cl.$^6$ .............................................. F16H 37/06
[52] U.S. Cl. .................. 74/665 F; 74/661; 74/665 L; 416/169 R
[58] Field of Search .................. 74/661, 665 A, 74/665 B, 665 D, 665 F, 665 B, 665 GA, 665 GB, 665 L; 416/169 R, 170 R

[56] References Cited

U.S. PATENT DOCUMENTS

| | | | |
|---|---|---|---|
| 2,351,219 | 6/1944 | McMullen | 74/665 B |
| 2,461,348 | 2/1949 | Pentecost | 416/169 X |
| 2,702,100 | 2/1955 | Montieth | 416/169 X |
| 4,983,153 | 1/1991 | Luijten | 475/343 |
| 5,178,028 | 1/1993 | Bossler, Jr. | 74/416 |
| 5,233,886 | 8/1995 | Bossler, Jr. | 74/665 F |

*Primary Examiner*—Charles A. Marmor
*Assistant Examiner*—Saul Rodriguez
*Attorney, Agent, or Firm*—Kinney & Lange

[57] ABSTRACT

A helicopter transmission presenting at least a first reduction unit receiving motion from a respective engine on the helicopter; and a second reduction unit connected to the first reduction unit and transmitting motion to the shaft of the main rotor; both reduction units presenting one reduction stage, and each including a pair of face gears coaxial with and facing each other and only one of which is fitted to the output shaft of the respective reduction unit; and two pinions of which one is a floating input pinion and the other is a fixed-axis pinion, and each of which meshes with both the face gears.

23 Claims, 4 Drawing Sheets

1

APPLICATION OF FACE GEARS TO HELICOPTER TRANSMISSIONS

BACKGROUND OF THE INVENTION

The present invention relates to the application of face gears to helicopter transmissions.

More specifically, the present invention relates to a transmission interposed between the engines and the main rotor of a helicopter, for achieving a given velocity ratio between the output shafts of the engines and the drive shaft of the main rotor, and for controlling rotation of both the tail rotor and the input shafts of the helicopter accessories.

For achieving said velocity ratio, known transmissions of the above type feature a number of ordinary, normally bevel gears meshing with one another to define, in most cases, two input speed reduction stages, and which are normally associated with an epicyclic gear train defining a third reduction stage.

Though reliable and still widely used, known transmissions of the above type present a major drawback in terms of weight and size, mainly due to the large number of component parts involved, which, among other things, also entail relatively time-consuming, high-cost assembly and setup operations. Also, by virtue of comprising a large number of moving parts, known transmissions are invariably a major source of noise.

SUMMARY OF THE INVENTION

It is an object of the present invention to provide a straightforward, low-cost transmission designed to overcome the aforementioned drawbacks while at the same time providing for a high degree of reliability.

According to the present invention, there is provided a helicopter transmission comprising at least an input shaft and a main output shaft rotating about respective axes and connected respectively to the engine and the main rotor of the helicopter; and gear transmission means interposed between the input shaft and the main output shaft, for achieving a given velocity ratio between the input and output shafts; characterized in that said transmission means comprise a first and second reduction unit interposed between said shafts, and each presenting one reduction stage.

In the above transmission, said first reduction unit preferably comprises a first floating pinion rotating about its axis and connected angularly integral with said input shaft; an intermediate shaft rotating about its axis; a first and second gear coaxial with each other and with said intermediate shaft, and presenting respective teeth meshing with the teeth of said first pinion, said first gear being fitted to said intermediate shaft, and said second gear being idle in relation to the intermediate shaft; and at least a second pinion presenting teeth meshing with those of said gears, and rotating about its axis which is fixed in relation to that of the input shaft.

Said second reduction unit preferably comprises a third floating pinion rotating about its axis and connected angularly integral with said intermediate shaft; a third and fourth gear coaxial with each other and with said main output shaft, and presenting respective teeth meshing with the teeth of said third pinion, said third gear being fitted to said main output shaft, and said fourth gear being idle in relation to the main output shaft; and at least a fourth pinion presenting teeth meshing with those of said third and fourth gears, and rotating about its axis which is fixed in relation to that of the main output shaft.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
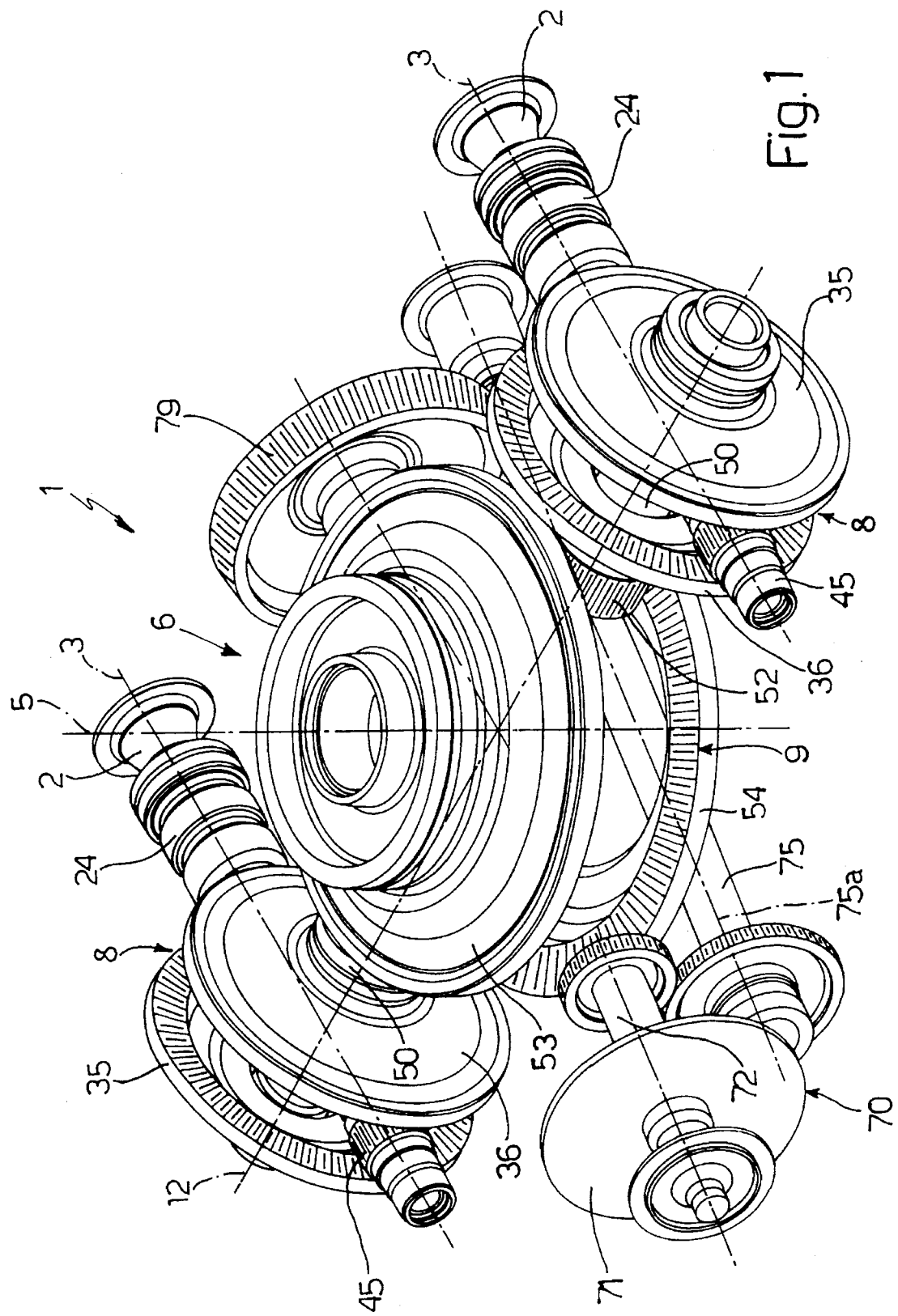
FIG. 1 shows a schematic view in perspective, with parts removed for clarity, of a preferred embodiment of the transmission according to the present invention.
Figure 2:
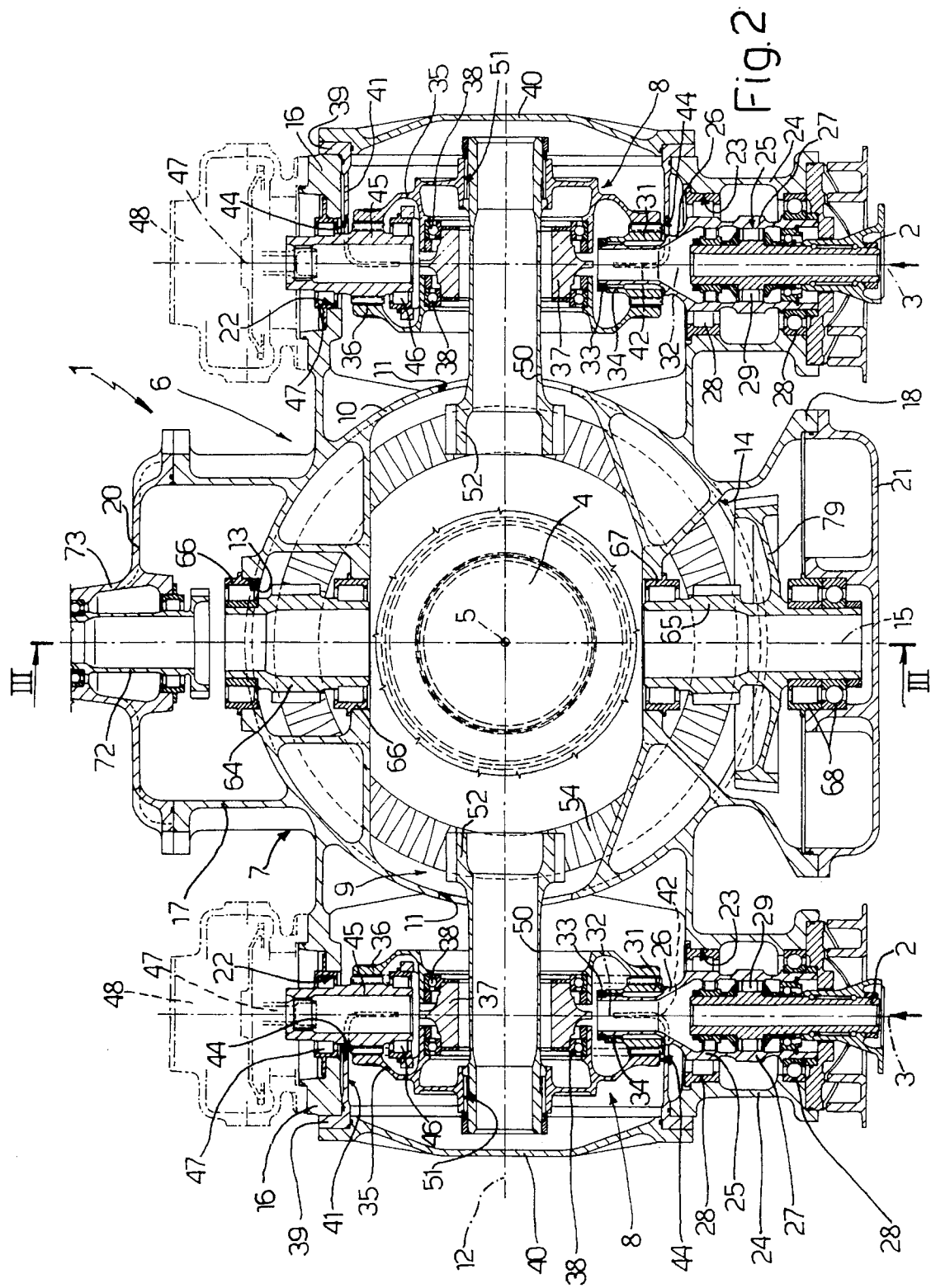
FIG. 2 shows a section of the FIG. 1 transmission.
Figure 3:
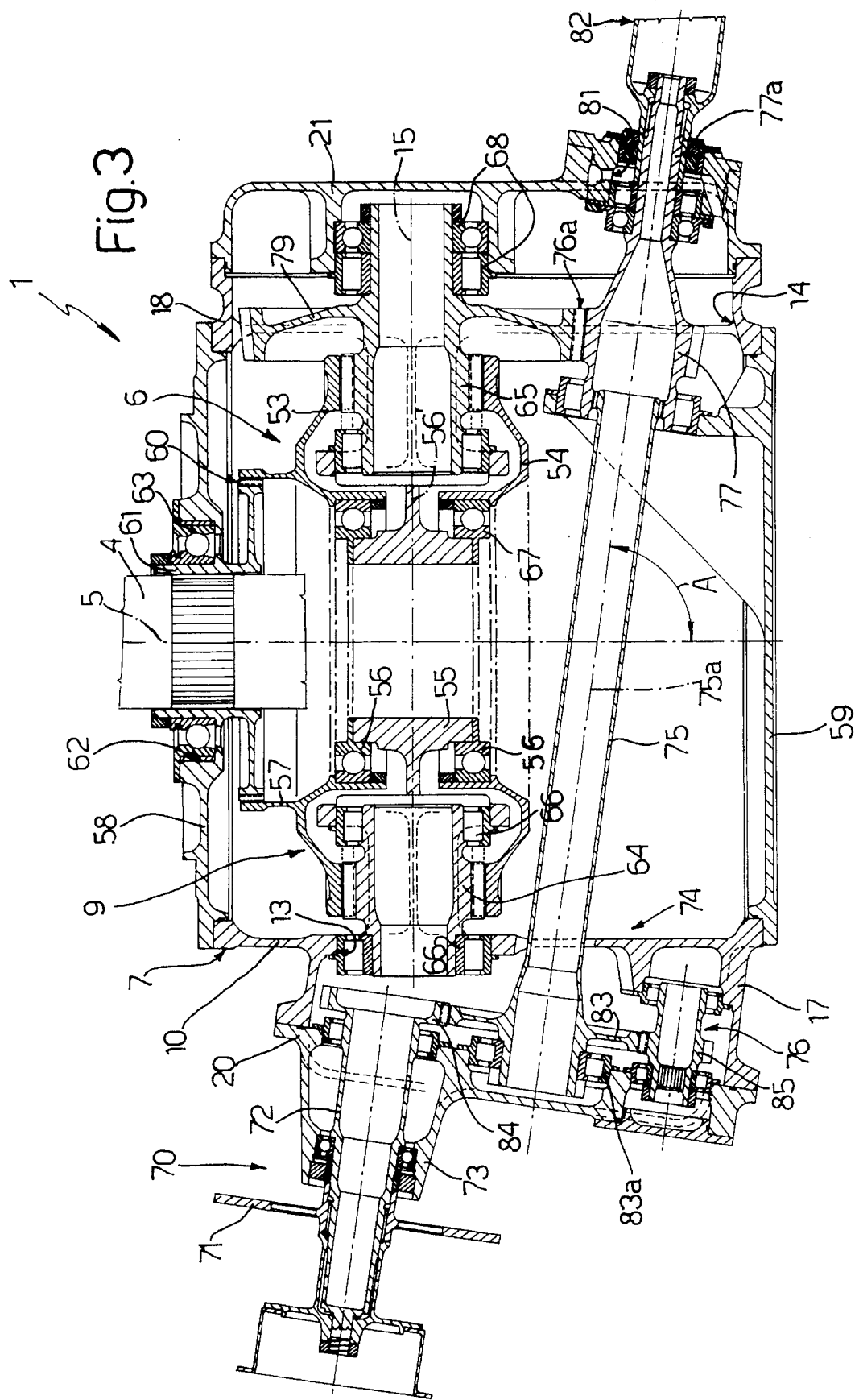
FIG. 3 a section along line III—III in FIG. 2.

Number 1 in FIGS. 1, 2 and 3 indicates a transmission for a helicopter (not shown), interposed between a pair of thrust engines (not shown) and the main rotor (not shown). Transmission 1 comprises a pair of input shafts 2 rotating about respective parallel axes 3 and connected in known manner to the output shafts of said engines; a main output shaft 4 (FIG. 3) rotating about its axis 5 and connected in known manner (not shown) to the main rotor (not shown); and a gear transmission 6 interposed between and for achieving a given velocity ratio between shafts 2 and 4.

As shown in FIG. 2, transmission 1 comprises an outer casing 7 housing two identical first reduction units 8 (FIGS. 1 and 2), each powered by a respective engine, and a second reduction unit 9 interposed between and powered by one or other of units 8, for rotating shaft 4 and hence the main rotor (not shown) about axis 5.

Figure 4:
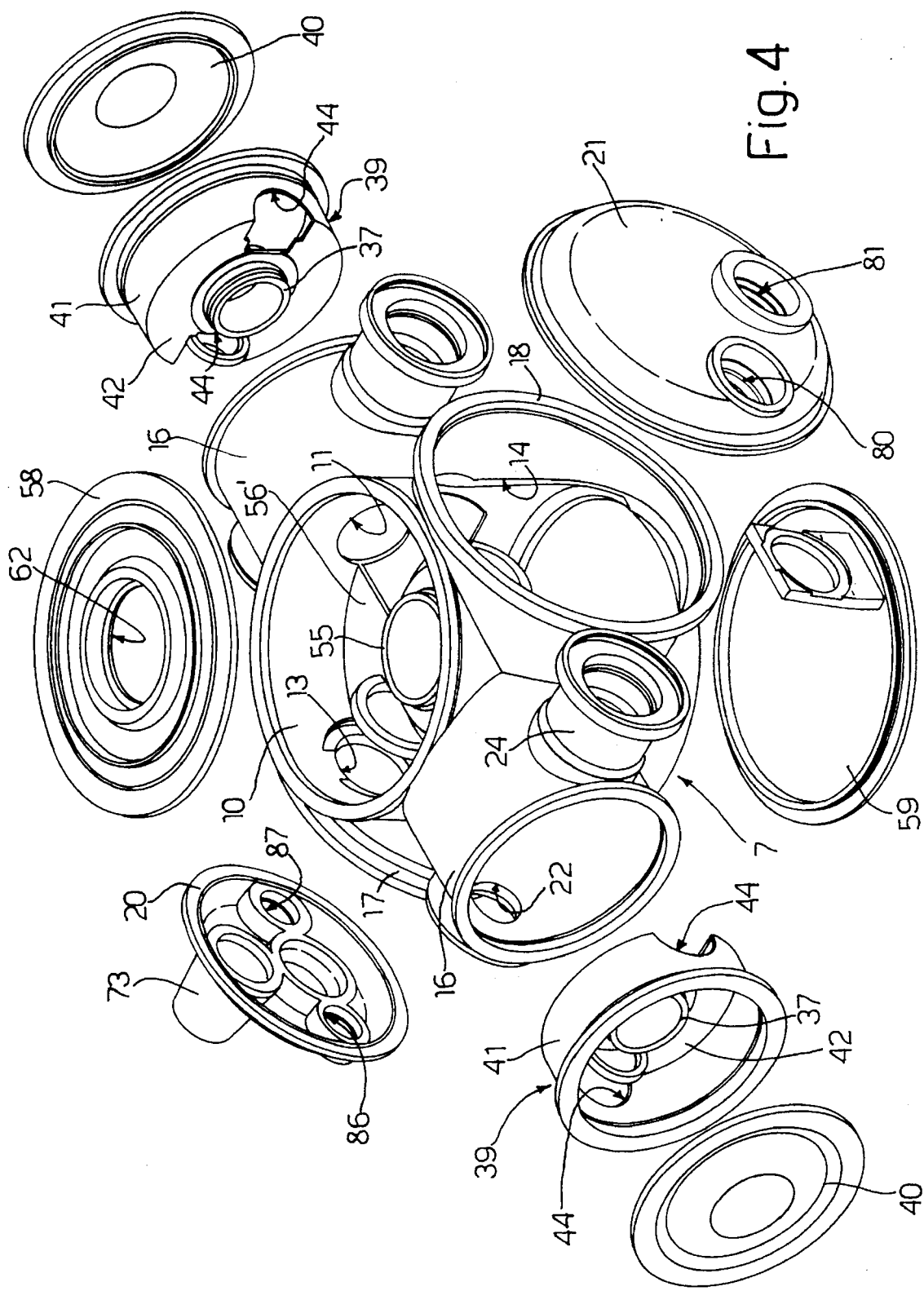
FIG. 4 shows an exploded view in perspective of a detail in FIG. 2.

As shown in FIG. 3 and particularly FIG. 4, casing 7 comprises a central tubular cylindrical body 10 extending coaxially with axis 5, surrounding shaft 4, and presenting two first openings 11 facing each other and substantially coaxial with a common axis 12 perpendicular to axes 3 and 5, and two second openings 13 and 14 also facing each other and substantially coaxial with an axis 15 perpendicular to axes 5 and 12.

Openings 11 are surrounded by respective tubular cylindrical bodies 16 integral with body 10 and extending coaxially with axis 12 on either side of body 10; and openings 13 and 14 are surrounded by respective tubular bodies 17 and 18 also integral with body 10, extending coaxially with axis 15 on either side of body 10, and closed by respective cup-shaped covers 20 and 21.

Each tubular body 16 presents two openings 22 and 23 facing each other and coaxial with axis 3; and opening 23 is surrounded by a cylindrical sleeve 24 projecting outwards of tubular body 16 and coaxial with axis 3.

As shown in FIG. 2, each tubular body 16 houses a respective unit 8 which comprises a hollow input shaft 25 extending through opening 23 and in turn comprising a first flexible end portion 26 extending inside body 16. Shaft 25 also comprises a second end portion 27 connected to sleeve 24 in rotary and axially-fixed manner by means of a pair of bearings 28, and to respective shaft 2 via the interposition of a free wheel 29. Portion 26 supports a hollow cylindrical pinion 31 which is fitted to portion 26 in floating manner and presents and axis 32 which in FIG. 2 is coincident with respective axis 3. More specifically, pinion 31 surrounds portion 26, is secured in axially slack manner in relation to portion 26 by a ring nut 33, and is connected to portion 26 by a relatively flexible sleeve 34, one end portion of which is connected to portion 26 by a splined coupling, and the opposite end portion of which is connected integral with pinion 31.

As shown in FIG. 2, the teeth of pinion 31 mesh with those of respective identical face gears 35 and 36 housed facing each other inside body 16 and coaxial with axis 12. Both gears 35 and 36 are supported on a single elongated hollow body 37 having an axis coincident with axis 12, and to which each gear 35, 36 is fitted by means of a respective single bearing 38. In the example shown, each bearing 38 substantially lies in a respective plane through the teeth, and more specifically through a free end portion of the teeth, of respective gear 35, 36.

As shown in FIGS. 2 and 4, body 37 forms the central portion of the bottom wall of a cup-shaped element 39 (FIG. 4) fittable to casing 7 and closed by a respective cover 40, and is connected to the lateral wall 41 of element 39 by a radial annular plate 42 of 2–4 millimeters in thickness. When assembled, lateral wall 41 positively engages a free end portion of respective body 16, and presents two openings 44 (FIG. 4) facing each other and corresponding (when assembled) with openings 22 and 23.

As shown in FIG. 2, each unit 8 also comprises a respective further cylindrical pinion 45 housed inside respective body 16, having a fixed axis coincident with respective axis 3, and extending on the diametrically-opposite side of respective gears 35, 36 in relation to respective pinion 31. The teeth of pinion 45 mesh with those of both gears 35 and 36, and pinion 45 is connected in rotary and axially-fixed manner, at one end, to the bottom wall of element 39 by means of a bearing 46, and, at the other end, to body 16 by means of a bearing 47. Pinion 45 projects outwards of body 16 through openings 22 and 44, and is connected, preferably by means of a splined coupling, to the shaft 47 of an accessory element 48, e.g. the hydraulic pump, of the helicopter.

Inside each body 16 and through respective hollow body 37, there extends, coaxially with axis 12, a flexible hollow shaft 50 constituting the output shaft of respective unit 8 and the input shaft of unit 9. More specifically, each shaft 50 presents an end portion connected solely to respective gear 35 by means of a splined coupling 51, whereas no connection, neither angular nor axial, exists between shaft 50 and gear 36. The end portion of shaft 50 opposite that connected to gear 35 projects inside body 10 through respective opening 11, and is fitted with a respective floating cylindrical pinion 52 presenting external teeth and forming part of unit 9. As shown in FIGS. 2 and 3, in addition to pinions 52, unit 9 also comprises two face gears 53 and 54 similar to gears 35 and 36. Gears 53 and 54 are housed inside central body 10 facing each other and coaxially with axis 5, present respective teeth meshing with those of pinions 52, and are both supported on a single hollow body 55 extending inside body 10 coaxially with axis 5 and which is connected integral with the inner surface of body 10 by means of a relatively thin annular plate 56' of about 2–4 millimeters in thickness. More specifically, each gear 53, 54 is connected to body 55 by means of a single bearing 56 which, in the example shown, substantially lies in a plane through the teeth, and more specifically through a free end portion of the teeth, of respective gear 53, 54.

As shown in FIG. 3, gear 53 presents an integral collar 57 extending, coaxially with axis 5, towards a first cover 58 facing a second cover 59 of body 10. By means of a splined coupling 60, collar 57 is fitted angularly integral with the outer flange of a sleeve 61 fitted to shaft 4, extending through an opening 62 in cover 58, and fitted to cover 58 in rotary and axially-fixed manner by means of a bearing 63.

As shown in FIG. 2, unit 9 also comprises a further two pinions 64 and 65, each associated with a respective pinion 52, and which are located, coaxially with axis 15, on diametrically-opposite sides of pinions 52 and at respective openings 13 and 14. Both pinions 64 and 65 are fixed-axis pinions, and present respective teeth meshing with those of gears 53 and 54. More specifically, pinion 64 is connected to body 10 by a pair of bearings 66, whereas pinion 65 is connected to body 10 by a bearing 67 and presents an end portion projecting outwards of body 10 through opening 14 and connected by a pair of bearings 68 to cover 21 closing opening 14.

As shown in FIG. 3, adjacent to pinion 64, transmission 1 is fitted with a known rotor brake assembly shown only partly and indicated as a whole by 70. Brake assembly 70 comprises a brake disk 71 fitted to a shaft 72 sloping in relation to axis 15 and extending through a sleeve 73 fitted to cover 20 and to which shaft 72 is fitted in rotary and axially-fixed manner. Shaft 72 is connected to pinion 65 by means of a transmission 74 comprising two gear assemblies 76 and 76a housed respectively inside bodies 17 and 18. Although gear assembly 76 is illustrated as a spur gear assembly, gear assembly 76 may be substituted with a face gear assembly similar to face gear assembly 76a should the axes of shaft 72 and 75 be not parallel to each other. Transmission 74 also comprises an intermediate shaft 75 interposed between and connecting assemblies 76 and 76a, and presenting an inclined axis 75a forming an angle A (FIG. 3) with axis 5.

At the end facing opening 14, shaft 75 is fitted by means of a splined coupling with a cylindrical pinion 77 forming part of assembly 76a and connected in rotary and axially-fixed manner to covers 21 and 59. Assembly 76a also comprises a conical face gear 79 integral with an intermediate portion of pinion 65 and meshing with both pinion 77 and a further pinion (not shown) fitted to a shaft (not shown) extending outwards of cover 21 through an opening 80 (FIG. 3) and constituting the input shaft of an oil pump (not shown). Pinion 77 presents an end portion 77a also projecting outwards of cover 21 through a respective opening 81 and connected to a known tail rotor assembly 82 shown only partly in FIG. 3.

Assembly 76 on the other hand comprises a first gear 83 which is fitted to the portion of shaft 75 projecting inside body 17 and connected to cover 20 by means of a bearing 83a, and meshes with a second cylindrical face gear 84 fitted to shaft 72. Gear 83 also meshes with a further two cylindrical gears 85 (only one shown in FIG. 3) housed inside and fitted in rotary and axially-fixed manner to body 17. Gears 85 are located at respective openings 86 and 87 (FIG. 4) through which the shafts (not shown) of a speedometer and an alternator (not shown) extend respectively for connection to a respective gear 85.

In actual use, when one of the engines (not shown) is operated, e.g. the one to the right in FIG. 2, an input torque is transmitted from the engine to shaft 2 and then via shaft 25 to respective pinion 31 which, by virtue of floating, divides the torque into two streams, one transmitted directly to shaft 50 by gear 35, and the other transmitted via gear 36 and pinion 45 back to gear 35 (closed loop).

Similarly, the torque transmitted to shaft 50 is in turn transmitted by shaft 50 to pinion 52 which, by virtue of floating, again divides the torque into two streams, one transmitted directly to shaft 4 by gear 53, and the other transmitted to gear 54 and by this to gear 53 via pinion 64 or 65 depending on the rotation direction of shaft 50 (closed loop).

Transmission 1 thus provides for achieving a desired velocity ratio between the engine shafts and the rotor shaft in no more than two reduction stages, one defined by one or other of units 8, and the other defined by unit 9.

Moreover, transmission 1 is extremely compact, lightweight and relatively cheap to produce and assemble, mainly due to presenting a relatively small number of parts of straightforward design and so enabling fast, troublefree assembly.

It should be pointed out that the reduction in assembly time is mainly due to the reduction units or overdrives of transmission 1 featuring face gears and therefore, as is known, not requiring precise axial positioning of the meshing gears for ensuring best performance.

As regards actual assembly of the various units inside casing 7, this is simplified by the geometry of casing 7 and by the presence of cup-shaped elements 39 which enable gears 35 and 36 to be fitted to respective supporting bodies 37 outside casing 7 and then fitted in a precise position inside casing 7 by simply engaging elements 39 inside respective bodies 16.

Gears 35 and 36 being face gears, each unit 8 is then completed by simply inserting pinions 31 and 45 between gears 35 and 36 and inside body 16 through respective openings 23 and 22.

Similarly, pinions 52, 64 and 65 are inserted radially between gears 53 and 54 after first fitting gears 53 and 54 inside body 10 and to supporting body 55 by means of bearings 56.

Finally, the reduction in weight and cost is also due to the configuration of units 8 and unit 9 enabling each gear 35, 36 and 53, 54 to be connected to respective supporting body 37, 55 using a single bearing 38, 56; and to the fact—far from negligible—that the axial components acting on gears 35, 36 and 53, 54 of units 8 and unit 9 respectively are perfectly balanced by terminating on respective supporting bodies 37, 55.

Clearly, changes may be made to transmission 1 as described and illustrated herein without, however, departing from the scope of the present invention. In particular, if necessary for design purposes, the axes of pinions 31 and 45, as opposed to being coaxial, may form any angle, e.g. 90°; and, as opposed to being equally spaced, pinions 52, 64 and 65 may be arranged in any angular position in relation to one another.

Finally, between pinions 31 and 45 and pinions 52, 64 and 65, further pinions may be provided for tapping small amounts of power, e.g. for powering further accessories on the helicopter.

We claim:

1. A helicopter transmission comprising an outer casing, at least an input shaft and a main output shaft rotating about respective axes and able to be connected respectively to an engine and a main rotor of the helicopter; and gear transmission means interposed between the input shaft and the main output shaft, said gear transmission means comprise a first and second reduction unit interposed between said shafts, and each presenting one reduction stage; said first reduction unit comprising a floating first pinion rotating about its axis and connected in angularly integral manner to said input shaft; an intermediate shaft rotating about its axis; a first and second gear coaxial with each other and with said intermediate shaft and presenting respective teeth meshing with the teeth of said first pinion, said first gear being fitted to said intermediate shaft, and said second gear being idle in relation to the intermediate shaft; and at least a second pinion presenting teeth meshing with those of said gears, and rotating about its axis which is fixed in relation to the axis of the input shaft; characterized in that at least the first reduction unit comprises a first supporting body for supporting said first and second gears; said first supporting body being housed inside said outer casing and coaxially with said intermediate shaft; and each of said first and second gears being connected to said first supporting body by means of a respective single first bearing.

2. A transmission as claimed in claim 1, characterized in that said two gears are identical face gears.

3. A transmission as claimed in claim 1, characterized in that said first reduction unit comprises relative mobility means interposed between said first pinion and said input shaft, for enabling the first pinion to rock in relation to the input shaft.

4. A transmission as claimed in claim 1, characterized in that the axes of said first and second pinions form an angle of substantially 90° with the axis of said intermediate shaft.

5. A transmission as claimed in claim 1, characterized in that said first and second pinions are coaxial, and extend on diametrically-opposite sides of said intermediate shaft.

6. A transmission as claimed in claim 1, characterized in that each of said first bearings lies in a plane perpendicular to the axis of said intermediate shaft and intersecting the teeth of the relative gear.

7. A transmission as claimed in claim 1, characterized in that said first reduction unit comprises supporting means for supporting said first hollow body; said supporting means positively and releasably engaging said outer casing.

8. A transmission as claimed in claim 7, characterized in that said supporting means comprise a cup-shaped element presenting a lateral wall positively engaging said outer casing; said first hollow body extending at least partly inside said lateral wall and being connected to the lateral wall by plate means.

9. A transmission as claimed in claim 8, characterized in that said outer casing and said lateral wall of said cup-shaped element present respective pairs of openings for enabling radial insertion of said first and second pinions between the teeth of said first and second gears.

10. A transmission as claimed in 1, characterized in that said second reduction unit comprises a floating third pinion rotating about its axis and connected in angularly integral manner to said intermediate shaft; a third and fourth gear coaxial with each other and with said main output shaft, and presenting respective teeth meshing with the teeth of said third pinion, said third gear being fitted to said main output shaft, and said fourth gear being idle in relation to the main output shaft; and at least a fourth pinion presenting teeth meshing with the teeth of said third and fourth gears, and rotating about its axis which is fixed in relation to the axis of the main output shaft.

11. A transmission as claimed in claim 10, characterized in that said third and fourth gears are identical face gears.

12. A transmission as claimed in claim 10, characterized in that said intermediate shaft is a flexible shaft projecting from said first gear; and said third pinion is fitted to the intermediate shaft.

13. A transmission as claimed in claim 10, characterized in that the axes of said third and fourth pinions form an angle of substantially 90° with the axis of said main output shaft.

14. A transmission as claimed in claim 10, characterized in that said second reduction unit comprises a second supporting body for supporting said third and fourth gears; said second supporting body being housed inside said outer casing and coaxially with said main output shaft; and each of said third and fourth gears being fitted to said second supporting body by means of a respective single second bearing.

15. A transmission as claimed in claim 14, characterized in that each of said second bearings lies in a plane perpendicular to the axis of said intermediate shaft and intersecting the teeth of the respective gear.

16. A transmission as claimed in claim 14, characterized in that said outer casing comprises a central tubular body at least partly surrounding said main output shaft; said second supporting body being housed inside said tubular body and being connected integral with the tubular body by plate means.

17. A transmission as claimed in claim 16, characterized in that said tubular body presents at least a pair of radial openings for enabling radial insertion of said third and fourth pinions between the teeth of said third and fourth gears.

18. A transmission as claimed in claim 10, characterized in that it also comprises an assembly for connecting the main output shaft to the brake assembly of said main rotor; the connecting assembly comprising a first and second gear transmission and an intermediate shaft connecting said transmissions to each other; the intermediate shaft rotating about its axis and forming with said main output shaft an angle of other than 90°.

19. A transmission as claimed in claim 18, characterized in that at least one transmission comprises a respective face gear.

20. A transmission as claimed in claim 19, characterized in that said second transmission comprises a first face gear fitted to an end portion of said fourth pinion; a pinion fitted to said intermediate connecting shaft.

21. A transmission as claimed in claim 1, characterized in that it comprises a further input shaft rotating about its axis and connected to a respective engine of the helicopter; and a further reduction unit identical to said first reduction unit and connected to the second reduction unit in parallel with the first reduction unit.

22. A helicopter transmission comprising an outer casing, at least an input shaft and a main output shaft rotating about respective axes and able to be connected respectively to an engine and a main rotor of the helicopter; and gear transmission means interposed between the input shaft and the main output shaft, said gear transmission means comprise a first and second reduction unit interposed between said shafts, and each presenting one reduction stage; said first reduction unit comprising a floating first pinion rotating about its axis and connected in angularly integral manner to said input shaft; an intermediate shaft rotating about its axis; a first and second gear coaxial with each other and with said intermediate shaft and presenting respective teeth meshing with the teeth of said first pinion, said first gear being fitted to said intermediate shaft, and said second gear being idle in relation to the intermediate shaft; and at least a second pinion presenting teeth meshing with those of said gears, and rotating about its axis which is fixed in relation to the axis of the input shaft; said second reduction unit comprises a floating third pinion rotating about its axis and connected in angularly integral manner to said intermediate shaft; a third and fourth gear coaxial with each other and with said main output shaft, and presenting respective teeth meshing with the teeth of said third pinion, said third gear being fitted to said main output shaft, and said fourth gear being idle in relation to the main output shaft; and at least a fourth pinion presenting teeth meshing with the teeth of said third and fourth gears, and rotating about its axis which is fixed in relation to the axis of the main output shaft; said second reduction unit comprises a supporting body for supporting said third and fourth gears; said supporting body being housed inside said outer casing and coaxially with said main output shaft; and each of said third and fourth gears being fitted to said supporting body by means of a respective single bearing.

23. A helicopter transmission comprising an outer casing, at least an input shaft and a main output shaft rotating about respective axes and able to be connected respectively to an engine and a main rotor of the helicopter; and gear transmission means interposed between the input shaft and the main output shaft, said gear transmission means comprise a first and second reduction unit interposed between said shafts, and each presenting one reduction stage; said first reduction unit comprising a floating first pinion rotating about its axis and connected in angularly integral manner to said input shaft; an intermediate shaft rotating about its axis; a first and second gear coaxial with each other and with said intermediate shaft and presenting respective teeth meshing with the teeth of said first pinion, said first gear being fitted to said intermediate shaft, and said second gear being idle in relation to the intermediate shaft; and at least a second pinion presenting teeth meshing with those of said gears, and rotating about its axis which is fixed in relation to the axis of the input shaft; said second reduction unit comprises a floating third pinion rotating about its axis and connected in angularly integral manner to said intermediate shaft; a third and fourth gear coaxial with each other and with said main output shaft, and presenting respective teeth meshing with the teeth of said third pinion, said third gear being fitted to said main output shaft, and said fourth gear being idle in relation to the main output shaft; and at least a fourth pinion presenting teeth meshing with the teeth of said third and fourth gears, and rotating about its axis which is fixed in relation to the axis of the main output shaft; the transmission including an assembly for connecting the main output shaft to the brake assembly of said main rotor; the connecting assembly comprising a first and second gear transmission and an intermediate shaft connecting said transmissions to each other; the intermediate shaft rotating about its axis and forming with said main output shaft an angle of other than 90°.

* * * * *

UNITED STATES PATENT AND TRADEMARK OFFICE
CERTIFICATE OF CORRECTION

PATENT NO. : 5,572,910
DATED : NOVEMBER 12, 1996
INVENTOR(S) : LUIGI TOMASELLI, VALTER BOLOGNA, GIOVANNI ODDONE

It is certified that error appears in the above-indentified patent and that said Letters Patent is hereby corrected as shown below:

On the Title Page [73] Assignee, delete "Studio Torta, Turin, Italy", insert --Fiatavio S.p.A., Torino, Italy--

Signed and Sealed this

Ninth Day of December, 1997

Attest:

BRUCE LEHMAN

Attesting Officer

Commissioner of Patents and Trademarks